May 15, 1945.  H. T. LAMBERT  2,375,855
MULTIPLE DISK BRAKE
Filed June 28, 1944  3 Sheets-Sheet 1

May 15, 1945.   H. T. LAMBERT   2,375,855
MULTIPLE DISK BRAKE
Filed June 28, 1944   3 Sheets-Sheet 2
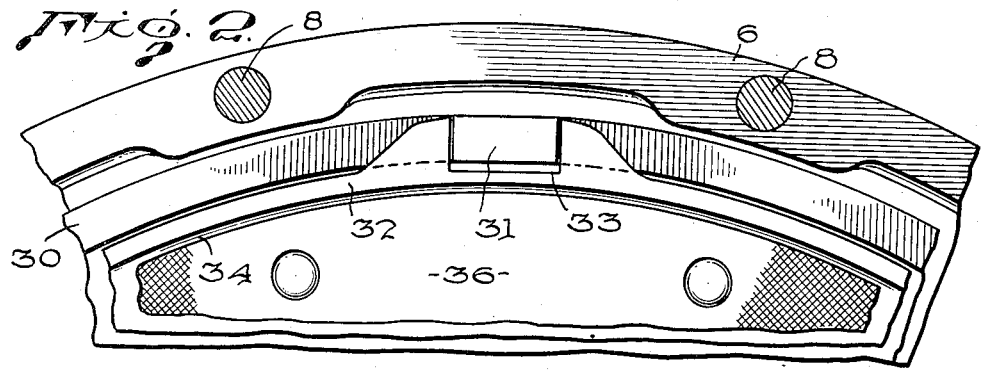
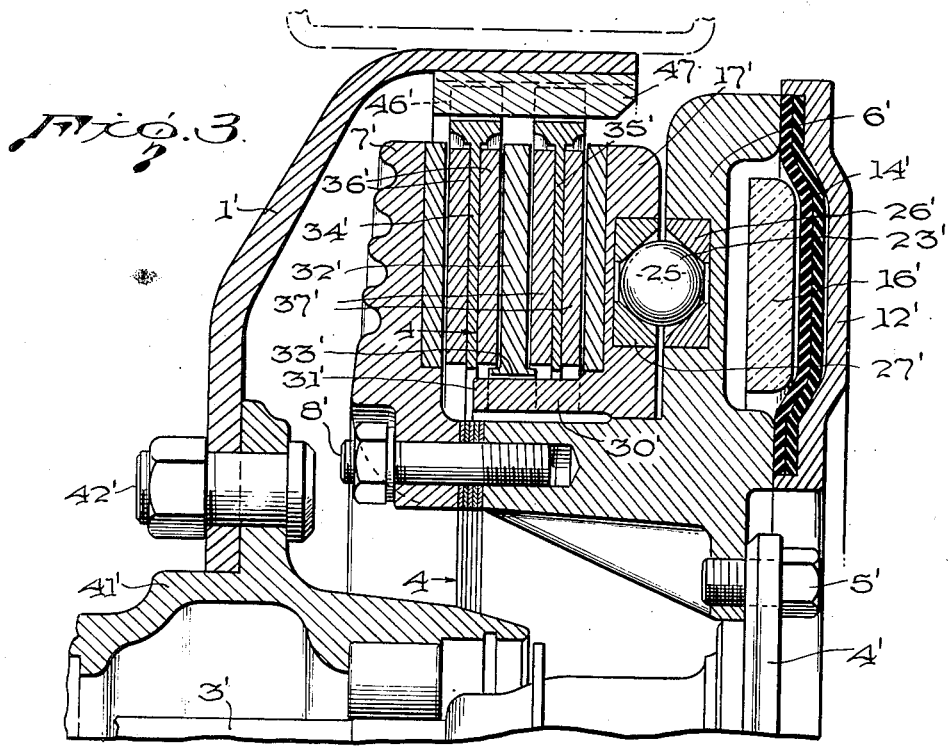
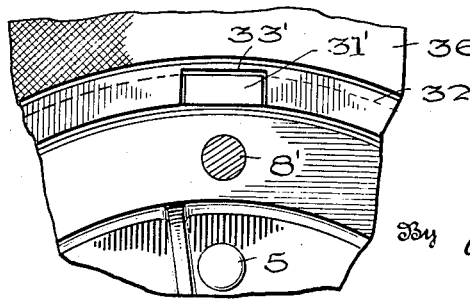
Inventor
H. T. Lambert
By Robt H Cobb
Attorneys

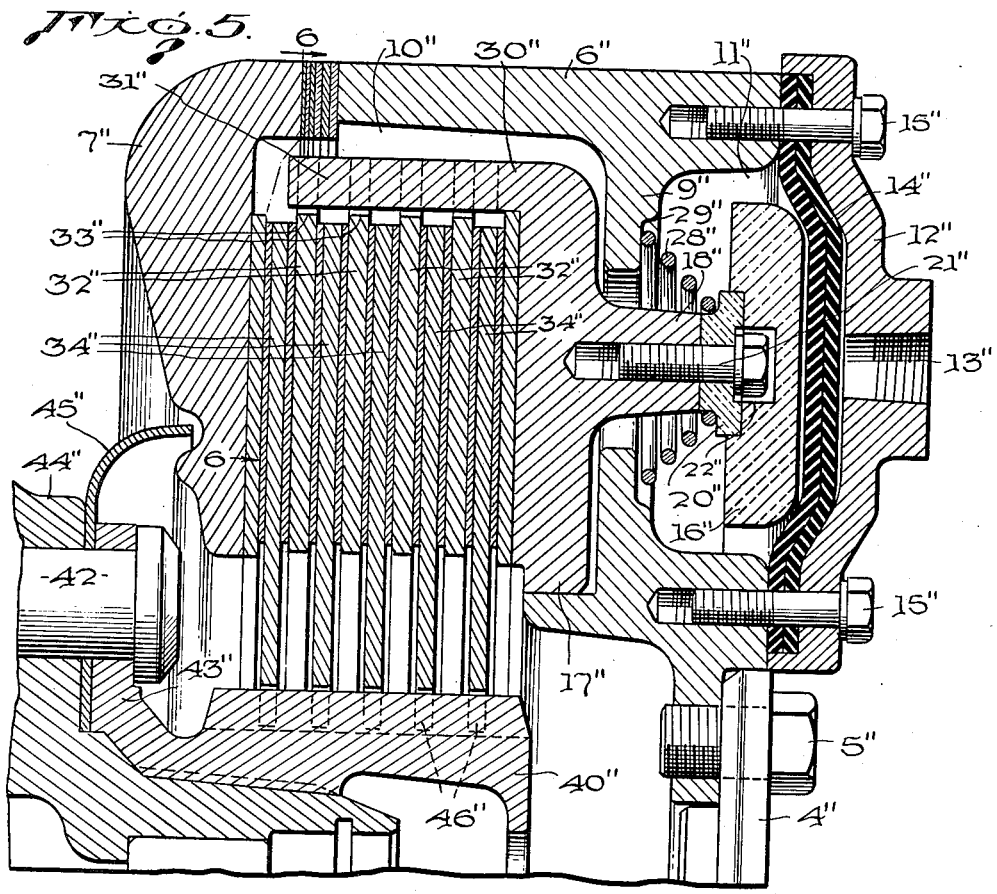
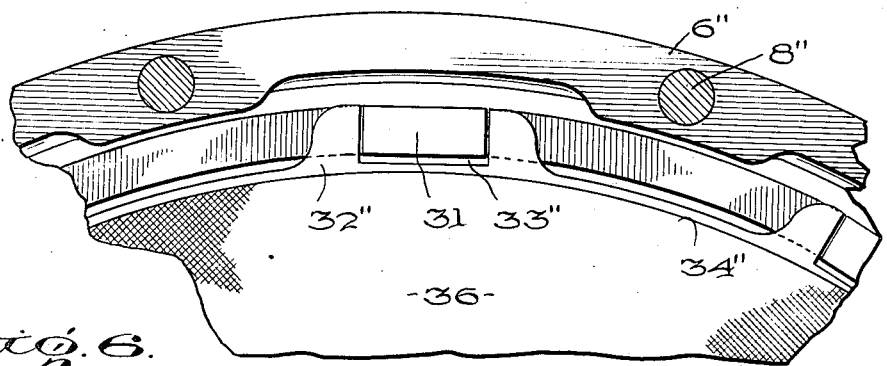

Patented May 15, 1945

2,375,855

UNITED STATES PATENT OFFICE 2,375,855

MULTIPLE DISK BRAKE

Homer T. Lambert, St. Joseph, Mich., assignor to Lambert Brake Corporation, St. Joseph, Mich., a corporation of Michigan Application June 28, 1944, Serial No. 542,511

6 Claims. (Cl. 188—72)

This invention relates to disk brakes of the self-energizing or servo-actuated type, and more especially to brakes of this character which are applicable to heavy duty service, such as for heavy industrial machinery, passenger and freight carrying vehicles, including automobiles, trucks, buses, airplanes, and the like, where heavy loads and relatively high speeds require brakes which are capable of withstanding severe service conditions.

The primary object of this invention is to provide a self-energizing brake in which the self-energizing or servo action is developed to an exceptionally high state with a minimum of effort, thereby permitting easy and efficient deceleration or stopping of heavy loads.

Another object of my invention is to provide an improved disk brake embodying a novel and efficient arrangement of multiple disks by which the self-energization is multiplied without undue complication of the brake design, and which may be applied to existing or known brake structures with but slight modification of the design.

A still further object of the invention is to provide a simple, compact and sturdy disk brake employing multiple disks, and which may be operated by either pneumatic or hydraulic fluid pressure, while requiring less pressure than is ordinarily necessary in present-day conventional brakes. Due to this reduction in pressure and the increased efficiency of my improved brake, there is less wear and strain on the brake linings and other operating parts of the brake.

Other and further objects and advantages of the invention will be hereinafter set forth and the novel features thereof defined by the appended claims.

In the drawings:

Figure 2 is a fragmentary sectional view taken on the line 2—2 of Figure 1;

Figure 3 is a fragmentary sectional view of a modified form of brake, and which is of the open type to allow effective ventilation;

Figure 4 is a fragmentary sectional view taken on the line 4—4 of Figure 3;

Figure 5 is a fragmentary vertical sectional view of still another modified form of brake, generally corresponding to the form of Figure 1, but employing a greater number of friction disks; and Figure 6 is a fragmentary sectional view taken on the line 6—6 of Figure 5.

Figure 1:
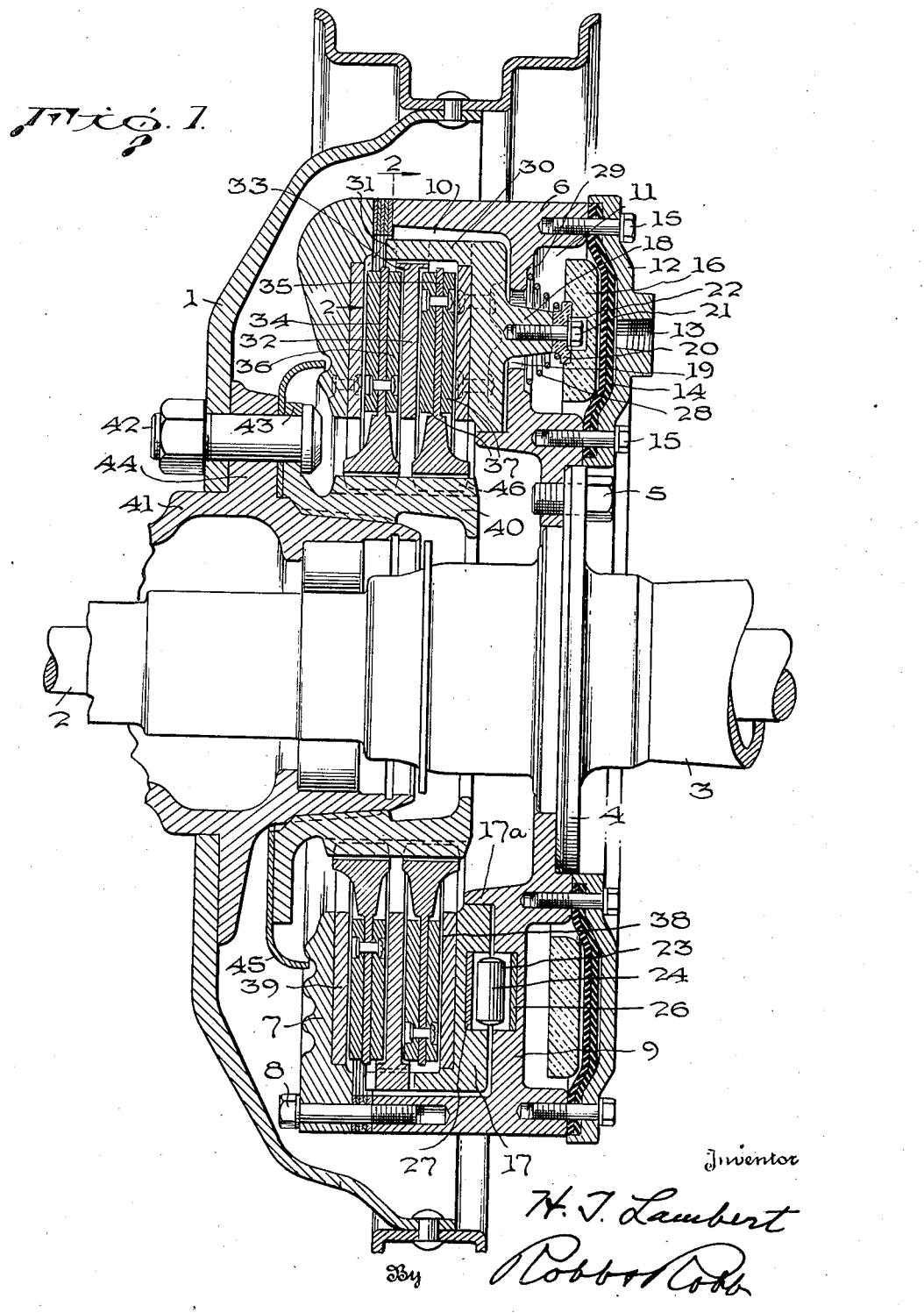
Figure 1 is a vertical sectional view taken through a brake constructed in accordance with this invention, as applied to a vehicle wheel, the axle and other parts of the wheel assembly being shown in elevation.

Like reference characters designate corresponding parts in the several figures of the drawings. Since the invention hereof resides in the brake unit per se, the mounting for the same needs no detailed explanation and will be only briefly referred to by way of illustration of the application of the brake to a vehicle wheel, which is generally designated 1, operating on an axle 2 mounted in a housing 3. The housing 3 is provided with an annular flange 4 on which the brake unit is mounted by means of the bolts 5.

The brake unit includes a drum-like casing or frame 6 to one end of which is attached a secondary brake disk 7 removably secured thereto by means of bolts 8 extending therethrough at spaced intervals about the disk. Within the casing or housing 6 adjacent to its end opposite to the secondary brake disk 7 is formed a partition 9 which divides the housing into two chambers respectively designated 10 and 11. The open end of the chamber 11 is normally closed by an annular cover plate 12 having an opening 13 therein adapted to be connected to a pressure fluid system of any suitable type and by which the pressure fluid, either pneumatic or hydraulic, may be admitted for actuating the brake in the conventional manner. Between the cover plate 12 and the end of the housing 6 is arranged an annular flexible diaphragm 14 which is held in place by the screws or bolts 15 which pass therethrough and through the cover plate to clamp the same to the housing. Also disposed in the chamber 11 is an insulated rigid ring 16 which is free to move axially pursuant to flexing of the diaphragm 14 in response to the pressure and release of the pressure fluid medium acting upon the diaphragm to flex the latter.

Mounted in chamber 10 at the opposite side of the partition 9 is a primary disc designated 17, which is free to move axially and also slightly rotatively on its mounting shoulder 17a. This primary disk is provided with circumferentially spaced protuberances or projections 18 which extend through openings 19 in the partition 9, said openings being sufficiently large to accommodate the protuberances 18 without interfering with the axial and rotative movements of the secondary disk. The outer ends of the protuberances are respectively provided with an enlarged head or button 20 secured thereto by a bolt 21, the head of which is received in a recess 22 provided in the inner face of the ring 16. These buttons or heads 20 are also preferably formed of insulating material to minimize the transfer of heat from the primary disk 17 to the ring 16 and flexible diaphragm 14 during braking operations.

Interposed between the primary disk 17 and the partition 9 of the housing 6 is a plurality of cam means generally designated 23, and which may be either in the form of rollers 24, as shown in Figure 1, or in the form of balls 25, as shown in Figure 3, said cam means being arranged in equally spaced relation to each other about the axis of the brake assembly and lying intermediate the protuberances or projections 18 above referred to. The balls or rollers, as the case may be, are interposed between oppositely facing cam inserts 26 and 27 respectively mounted in recesses in the partition 9 and the primary disk 17. The inserts 26 and 27 are each provided with oppositely inclined cam faces so that when relative rotative movement occurs between the housing 6 and the primary brake disk 17, the balls or rollers will roll on these cam faces and cause axial movement of the primary brake disk, as more fully described in my prior patents numbered 2,099,489, dated November 16, 1937, and 2,161,359 dated June 6, 1939. A coil spring 28 is disposed about each of the protuberances 18, with one end of the spring seating in a well 29 and the opposite end abutting against the head 20 on the end of the protuberance, so that the primary brake disk 17 is normally urged axially in the direction towards the partition 9, while yieldingly permitting the primary brake disk to move axially in the opposite direction responsive to the pressure fluid and camming action of the balls or rollers previously described.

So much of the brake structure as has just been described substantially conforms to the structure disclosed in my co-pending application Serial No. 525,186, filed March 6, 1944. Reference will now be made to the important distinctions which attain marked advantages and improved brake efficiency over that prior brake construction.

As shown in the form of the brake illustrated in Figures 1 and 2, the primary brake disk 17 is provided with an axially extended marginal flange 30 having a series of axially projecting lugs or bosses 31 formed on its outer end and arranged in circumferentially spaced relation to each other. Interconnected with the axially extended flange 30 of the primary disk 17 is an annular ring 32 having a series of circumferentially spaced recesses 33 formed at the outer margin thereof and normally loosely receiving the respective bosses 31 on the end of the flange 30. Thus the ring 32 is positively fixed to the primary brake disk 17 for rotation with the latter, while at the same time permitting relative axial movement between the ring and the secondary brake disk as will hereinafter more fully become apparent.

Also mounted in the chamber 10 and arranged at opposite sides of the ring 32 is a plurality of friction disks 34 and 35, there being two such disks in the form of the brake shown in Figure 1. These friction discs 34 and 35 are each preferably provided on opposite faces thereof with friction linings 36 and 37 suitably riveted or otherwise secured thereto. The braking surface of the primary disk 17, as well as the braking surface of the secondary disk 7 may each be provided with facings or linings 38 and 39 similarly riveted or otherwise secured to the disks.

The friction disks 34 and 35 are mounted upon an annular sleeve or adapter 40, which in turn is keyed, splined, or otherwise fixed to the wheel hub 41 of the wheel proper 1. Bolts 42 extending through a radial flange 43 on the adapter 40 and through the flange 44 on the hub 41 are preferably employed to rigidly connect these parts together and to the wheel 1. A guard 45 interposed between the flanges 43 and 44 and extending in close proximity to the outer face of the secondary disk 7 serves to close this end of the brake housing 6 against the entrance of dirt, dust and other foreign matter.

The friction disks 34 and 35 are mounted on the adapter 40 so as to be freely movable axially relative thereto and relative to each other while rotating with the wheel 1. This connection may be obtained by providing the outer surface of the adapter 40 with a series of splines respectively cooperating with mating splines on the friction disks, as indicated at 46.

In the operation of the construction of Figure 1, it will be obvious from the foregoing that when air or hydraulic fluid is admitted through the inlet 13 in the cover plate 12, the fluid pressure acting against the diaphragm 14 will cause the ring 16 to move to the left, as viewed in this figure, which in turn urges the primary brake disk 17 to the left, thereby engaging the braking surface of this primary disk with the rotating friction disk 35. At the same time, the intermediate ring 32 carried by the primary disk 17 and arranged intermediate the friction disks 34 and 35 is likewise caused to move axially into engagement with the friction disks to supplement the frictional resistance resulting from engagement of the main braking surface of the primary disk with the friction disk 35. This powerful frictional resistance thereby imparts a drag to the primary brake disk 17, causing the same to rotate slightly, which in turn energizes the cam members 23 in an obvious manner, producing a powerful braking action by engagement of the braking surfaces of all of the disks. This braking action is so greatly multiplied by the novel relationship of the multiple disks hereinbefore described that the brake unit is fully capable of meeting and standing up under the demands attending brake applications under heavy loads and at high speeds. Moreover, the increased power of self-energization attending the use of the multiple disk arrangement enables the brake applications to be made with a minimum of effort and at reduced pressures considerably below those formerly required in brakes of this type.

The construction and operation of the modified form of brake unit, as shown in Figures 3 and 4, is much the same as has been described above, the principal difference residing in a somewhat different means of mounting the intermediate ring 32' and the friction disks 34' and 35'. According to this modification, the primary disk 17' is axially extended to provide an inner hub or sleeve 30' having spaced lugs 31' arranged on its end and axially projecting therefrom so as to be loosely received in corresponding recesses 33' formed in the inner edge of the ring 32'. By this arrangement, the ring is relatively fixed to the primary disk 17' for rotation therewith, while it is free to move axially relative thereto. The friction disks 34' and 35', on the other hand, are connected at their outer peripheries to the wheel 1 by means of radial extensions 46' loosely engaged in an axially grooved connector 47 fixed to the wheel. Accordingly, the friction disks 34' and 35' are caused to be rotated with the wheel 1, while they are free to shift axially intermediate the primary disk 17' and the secondary disk 7' during the braking operation, as the braking surfaces of these elements are brought into cooperation by the initial axial thrust imparted to the primary disk 17' by the fluid pressure medium, and which automatically energizes the brake to produce an extremely powerful braking action.

It will be noted that in the modified form of the brake as shown in Figure 3, the brake disks are more or less exposed by the use of a housing 6' of somewhat different form, eliminating the chamber 10 of the construction shown in Figure 1. Where the conditions of use so permit, this modified form of brake unit is equally effective as the form of Figure 1, while at the same time affording extra ventilation by reason of the open construction, to aid in the dissipation of the heat produced by the braking action. In other respects, the brakes are essentially the same, and similar parts are designated by the primed reference characters.

Referring to Figures 5 and 6, these figures show another modified form of the invention which more closely conforms to the structure shown in Figure 1, except that the friction disks and the intermediate rings have been increased in number so as to still further increase the power of self-energization and braking force of the brake. In this form of the invention, the intermediate rings are designated 32", and the friction disks are designated 34". Otherwise, similar parts are represented by the double primed reference characters. The operation of the construction shown in Figures 5 and 6 conforms to that previously set forth in connection with Figure 1, and, accordingly, no further explanation is necessary.

It will be understood, of course, that the number of friction disks and intermediate rings shown in the different forms of the invention may be increased to any number desired, within practical limits, and I do not wish to be limited to the details herein shown and described, as other changes and alterations may be made without departing from the spirit of the invention as defined by the appended claims.

What I claim is:

1. A brake unit of the class described, comprising a stationary casing, a secondary brake member carried by and fixed to the casing at one end thereof, a primary brake member arranged in axially spaced relation to the secondary brake member and axially and rotatively movable relative thereto, a plurality of friction members disposed intermediate said primary and secondary brake members and axially movable relative thereto and relative to each other, certain of said friction members being interconnected with the primary brake member and certain others of the friction members being rotatable and provided with means for interconnecting the same with a rotatable part to be braked, cam means coacting with the primary brake member and operable responsive to rotative movement of the latter for imparting axial movement thereto and braking engagement of the respective friction, primary and secondary brake members, and thrust means acting upon the primary brake member for initially engaging the friction members and the primary brake member to cause rotative movement of the latter and consequent energization of the cam means.

2. A brake unit as defined in claim 1, wherein the primary and secondary brake members and the intermediate friction members have the form of annular disks arranged on a common axis, and the friction members include at least two disks disposed respectively in contiguous relation to the primary and secondary brake members, and a third disk intermediate the two disks aforesaid.

3. A brake unit as defined in claim 1, wherein the primary and secondary brake members and the intermediate friction members have the form of annular disks arranged on a common axis, and the friction members include alternately rotatable and relatively fixed disks.

4. A brake unit as defined in claim 1, wherein the primary and secondary brake members and the intermediate friction members have the form of annular disks arranged on a common axis, and the primary brake member is axially extended for interconnection with certain of the intermediate friction disks.

5. A brake unit as defined in claim 1, wherein the means for interconnecting certain of the friction members with the rotatable part to be braked includes an annular part on which the friction members are slidably mounted, said annular part having a radially extended flange at one end thereof for connection with the part to be braked.

6. In servo brake mechanism for vehicle wheels, the combination of a frame, a stationary friction member at one end thereof, a plurality of disks rotatably mounted between the frame and the stationary friction member aforesaid in spaced relation to each other and operatively connected to a wheel to be braked, a plurality of friction disks arranged to coact with said rotatable disks to impart braking action, said friction disks comprising a primary disk axially movable into braking contact with one of said rotatable disks and slightly rotatable therewith and having thereon a mounting on which the other friction disks are slidable relative to the coacting rotatable disks to be braked and also rotatable with the primary disk, actuating means for shifting the primary disk and the friction disks thereon into braking relation to the rotatable disks, and energizing means operable upon such shifting and rotative movement of the primary disk to set up simultaneous energization of all of the friction disks.

HOMER T. LAMBERT.